(12) United States Patent
Chen et al.

(10) Patent No.: US 11,630,209 B2
(45) Date of Patent: Apr. 18, 2023

(54) LASER WAVEFORM EMBEDDING

(71) Applicant: Waymo LLC, Mountain View, CA (US)

(72) Inventors: Mingcheng Chen, Sunnyvale, CA (US); Christian Lauterbach, Campbell, CA (US); Colin Braley, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 890 days.

(21) Appl. No.: 16/506,141

(22) Filed: Jul. 9, 2019

(65) Prior Publication Data

US 2021/0011161 A1  Jan. 14, 2021

(51) Int. Cl.
*G01S 17/89* (2020.01)
*G05D 1/02* (2020.01)
(Continued)

(52) U.S. Cl.
CPC ............ *G01S 17/89* (2013.01); *G01S 7/4865* (2013.01); *G01S 17/10* (2013.01); *G01S 17/931* (2020.01);
(Continued)

(58) Field of Classification Search
CPC ........ G01S 17/10; G01S 17/89; G01S 17/931; G01S 7/4865; G05D 1/0231;
(Continued)

(56) References Cited

U.S. PATENT DOCUMENTS 9,097,800 B1 * 8/2015 Zhu .................... G01S 13/931
9,576,185 B1   2/2017 Delp
(Continued)

FOREIGN PATENT DOCUMENTS

| KR | 101899549 | 9/2018 |
|----|-----------|--------|
| KR | 20180104213 | 9/2018 |
| WO | 2014/168851 | 10/2014 |

OTHER PUBLICATIONS

International Searching Authority, International Search Report and Written Opinion dated Oct. 15, 2020, issued in connection with International Patent Application No. PCT/US2020/039532 filed on Jun. 25, 2020, 10 pages.
(Continued)

*Primary Examiner* — Daniel L Greene
(74) *Attorney, Agent, or Firm* — McDonnell Boehnen Hulbert & Berghoff LLP

(57) ABSTRACT

A system includes a light detection and ranging device configured to generate, for each respective point of a plurality of points in an environment, a corresponding waveform that represents physical characteristics of the respective point. The system also includes a signal processor configured to determine, based on the corresponding waveform of each respective point, a map of the environment that includes a representation of a corresponding position of the respective point. The system additionally includes an embedding model configured to determine, for each respective point and based on the corresponding waveform, a corresponding vector comprising a plurality of values representative of the physical characteristics of the respective point. The system further includes a feature detector configured to detect or classify a physical feature based on (i) the corresponding positions of one or more points of the plurality of points and (ii) the corresponding vectors of the one or more points.

20 Claims, 11 Drawing Sheets

(51) Int. Cl.
*G01S 17/931* (2020.01)
*G01S 17/10* (2020.01)
*G01S 7/4865* (2020.01)
*G06N 3/04* (2006.01)
*G06N 3/08* (2006.01)

(52) U.S. Cl.
CPC ............ *G05D 1/0231* (2013.01); *G06N 3/04* (2013.01); *G06N 3/0454* (2013.01); *G06N 3/08* (2013.01); *G05D 2201/0213* (2013.01)

(58) Field of Classification Search
CPC ............ G05D 2201/0213; G06N 3/04; G06N 3/0454; G06N 3/08
See application file for complete search history.

(56) References Cited

U.S. PATENT DOCUMENTS

| | | | |
|---|---|---|---|
| 9,852,357 B2 | 12/2017 | Zhang et al. | |
| 10,839,234 B2* | 11/2020 | Wang | G06V 20/56 |
| 11,048,977 B1* | 6/2021 | Ulbricht | G06V 10/7715 |
| 2014/0368807 A1 | 12/2014 | Rogan | |
| 2016/0035081 A1* | 2/2016 | Stout | G06V 20/58 |
| | | | 382/103 |
| 2017/0135617 A1* | 5/2017 | Alasirniö | A61B 5/14552 |
| 2018/0074493 A1 | 3/2018 | Prokhorov et al. | |
| 2018/0218265 A1* | 8/2018 | Diaz Caceres | G06N 5/02 |
| 2018/0284244 A1* | 10/2018 | Russell | G01S 7/484 |
| 2018/0306924 A1 | 10/2018 | Olson et al. | |
| 2018/0314253 A1 | 11/2018 | Mercep et al. | |
| 2018/0348346 A1 | 12/2018 | Vallespi-Gonzalez et al. | |
| 2019/0079526 A1 | 3/2019 | Vallespi-Gonzalez et al. | |
| 2019/0196436 A1* | 6/2019 | Nagarajan | G05B 19/124 |
| 2019/0319707 A1* | 10/2019 | Jarett | H04B 10/2575 |
| 2020/0026960 A1* | 1/2020 | Park | G05D 1/0077 |
| 2021/0012116 A1* | 1/2021 | Urtasun | G06V 10/7753 |
| 2021/0165852 A1* | 6/2021 | Granger | G06V 10/7635 |

OTHER PUBLICATIONS

Navarro et al., A Machine Learning Approach to Pedestrian Detection for Autonomous Vehicles Using High-Definition 3D Range Data, Sensors (Basel), Published Dec. 23, 2016, doi: 10.3390/s17010018.

* cited by examiner

| POINT INDEX 600 | MAP COORDINATES 602 | REFLECTIVITY 604 | SURFACE NORMAL 606 | ... | FIRST EMBEDDING DIMENSION 608 | SECOND EMBEDDING DIMENSION 610 | ... | NTH EMBEDDING DIMENSION 612 |
|---|---|---|---|---|---|---|---|---|
| 1 | $X_1, Y_1, Z_1$ | $R_1$ | $NX_1, NY_1, NZ_1$ | ... | $X_{1,1}$ | $X_{2,1}$ | ... | $X_{N,1}$ |
| 2 | $X_2, Y_2, Z_2$ | $R_2$ | $NX_2, NY_2, NZ_2$ | ... | $X_{1,2}$ | $X_{2,2}$ | ... | $X_{N,2}$ |
| 3 | $X_3, Y_3, Z_3$ | $R_3$ | $NX_3, NY_3, NZ_3$ | ... | $X_{1,3}$ | $X_{2,3}$ | ... | $X_{N,3}$ |
| 4 | $X_4, Y_4, Z_4$ | $R_4$ | $NX_4, NY_4, NZ_4$ | ... | $X_{1,4}$ | $X_{2,4}$ | ... | $X_{N,4}$ |
| 5 | $X_5, Y_5, Z_5$ | $R_5$ | $NX_5, NY_5, NZ_5$ | ... | $X_{1,5}$ | $X_{2,5}$ | ... | $X_{N,5}$ |
| 6 | $X_6, Y_6, Z_6$ | $R_6$ | $NX_6, NY_6, NZ_6$ | ... | $X_{1,6}$ | $X_{2,6}$ | ... | $X_{N,6}$ |
| 7 | $X_7, Y_7, Z_7$ | $R_7$ | $NX_7, NY_7, NZ_7$ | ... | $X_{1,7}$ | $X_{2,7}$ | ... | $X_{N,7}$ |
| 8 | $X_8, Y_8, Z_8$ | $R_8$ | $NX_8, NY_8, NZ_8$ | ... | $X_{1,8}$ | $X_{2,8}$ | ... | $X_{N,8}$ |
| ... | ... | ... | ... | ... | ... | ... | ... | ... |
| M | $X_M, Y_M, Z_M$ | $R_M$ | $NX_M, NY_M, NZ_M$ | ... | $X_{1,M}$ | $X_{2,M}$ | ... | $X_{N,M}$ |

Figure 6

LASER WAVEFORM EMBEDDING

BACKGROUND

Light detection and ranging (LIDAR) devices may estimate distances to objects in a given environment. For example, an emitter subsystem of a LIDAR device may emit near-infrared light pulses, which may interact with objects in the device's environment. At least a portion of the light pulses may be redirected back toward the LIDAR (e.g., due to reflection or scattering) and detected by a detector subsystem. Conventional detector subsystems may include a plurality of detectors and a corresponding controller configured to determine an arrival time of the respective light pulses with high temporal resolution (e.g., ~400 ps). The distance between the LIDAR device and a given object may be determined based on a time of flight of the corresponding light pulses that interact with the given object.

SUMMARY

An autonomous vehicle may be configured to navigate through different environments based on data from a LIDAR device. The LIDAR device may generate, for each respective point of a plurality of points, a corresponding waveform that is representative of the physical properties of the respective point. A map of the environment may be generated based on the waveforms by using one or more predetermined equations to extract from the waveforms a subset of the physical properties of the plurality of points. However, some aspects of the waveforms might not be used by the predetermined equations, resulting in a second subset of the physical properties remaining unmeasured. Thus, an embedding model may be used to measure the second subset of the physical properties. Namely, the embedding model may generate, for each respective point and based on the waveform thereof, a vector of values that are representative of at least the second subset of the physical properties. The map and the vectors may be used by various feature detectors to detect physical features within the environment and perform other operations related to autonomous vehicle navigation. The embedding model may thus allow the feature detector to utilize metrics of additional physical properties of the points beyond those already identified by way of the predetermined equations, resulting in greater utilization of the information contained in each waveform.

In a first example embodiment, a system includes a LIDAR device configured to generate, for each respective point of a plurality of points in an environment, a corresponding waveform that represents physical characteristics of the respective point. The system also includes a signal processor configured to determine, based on the corresponding waveform of each respective point, a map of the environment that includes therein a representation of a corresponding position of the respective point within the environment. The system additionally includes an embedding model configured to determine, for each respective point and based on the corresponding waveform, a corresponding vector that includes a plurality of values that are representative of the physical characteristics of the respective point. The system further includes a feature detector configured to detect and/or classify a physical feature within the environment based on (i) the corresponding positions of one or more points of the plurality of points and (ii) the corresponding vectors of the one or more points.

In a second example embodiment, a method includes generating, by a LIDAR device and for each respective point of a plurality of points in an environment, a corresponding waveform that represents physical characteristics of the respective point. The method also includes determining, by a processor and based on the corresponding waveform of each respective point, a map of the environment that includes therein a representation of a corresponding position of the respective point within the environment. The method additionally includes determining, by the processor, for each respective point, and based on the corresponding waveform, a corresponding vector based on an embedding model. The corresponding vector includes a plurality of values that are representative of the physical characteristics of the respective point. The method further includes detecting and/or classifying, by the processor, a physical feature within the environment based on (i) the corresponding positions of one or more points of the plurality of points and (ii) the corresponding vectors of the one or more points.

In a third example embodiment, a non-transitory computer readable storage medium is provided having stored thereon instructions that, when executed by a computing system, cause the computing system to perform operations. The operations include receiving, from a LIDAR device and for each respective point of a plurality of points in an environment, a corresponding waveform that represents physical characteristics of the respective point. The operations also include determining, based on the corresponding waveform of each respective point, a map of the environment that includes a representation of a corresponding position of the respective point within the environment. The operations additionally include determining, for each respective point and based on the corresponding waveform, a corresponding vector based on an embedding model. The corresponding vector includes a plurality of values that are representative of the physical characteristics of the respective point. The operations further include detecting and/or classifying a physical feature within the environment based on (i) the corresponding positions of one or more points of the plurality of points and (ii) the corresponding vectors of the one or more points.

In a fourth example embodiment, a system is provided that includes means for generating, for each respective point of a plurality of points in an environment, a corresponding waveform that represents physical characteristics of the respective point. The system also includes means for determining, based on the corresponding waveform of each respective point, a map of the environment that includes a representation of a corresponding position of the respective point within the environment. The system additionally includes means for determining, for each respective point and based on the corresponding waveform, a corresponding vector based on an embedding model. The corresponding vector includes a plurality of values that are representative of the physical characteristics of the respective point. The system further includes means for detecting and/or classifying a physical feature within the environment based on (i) the corresponding positions of one or more points of the plurality of points and (ii) the corresponding vectors of the one or more points.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 6 illustrates a table of map data, in accordance with example embodiments.

DETAILED DESCRIPTION

Figure 1:
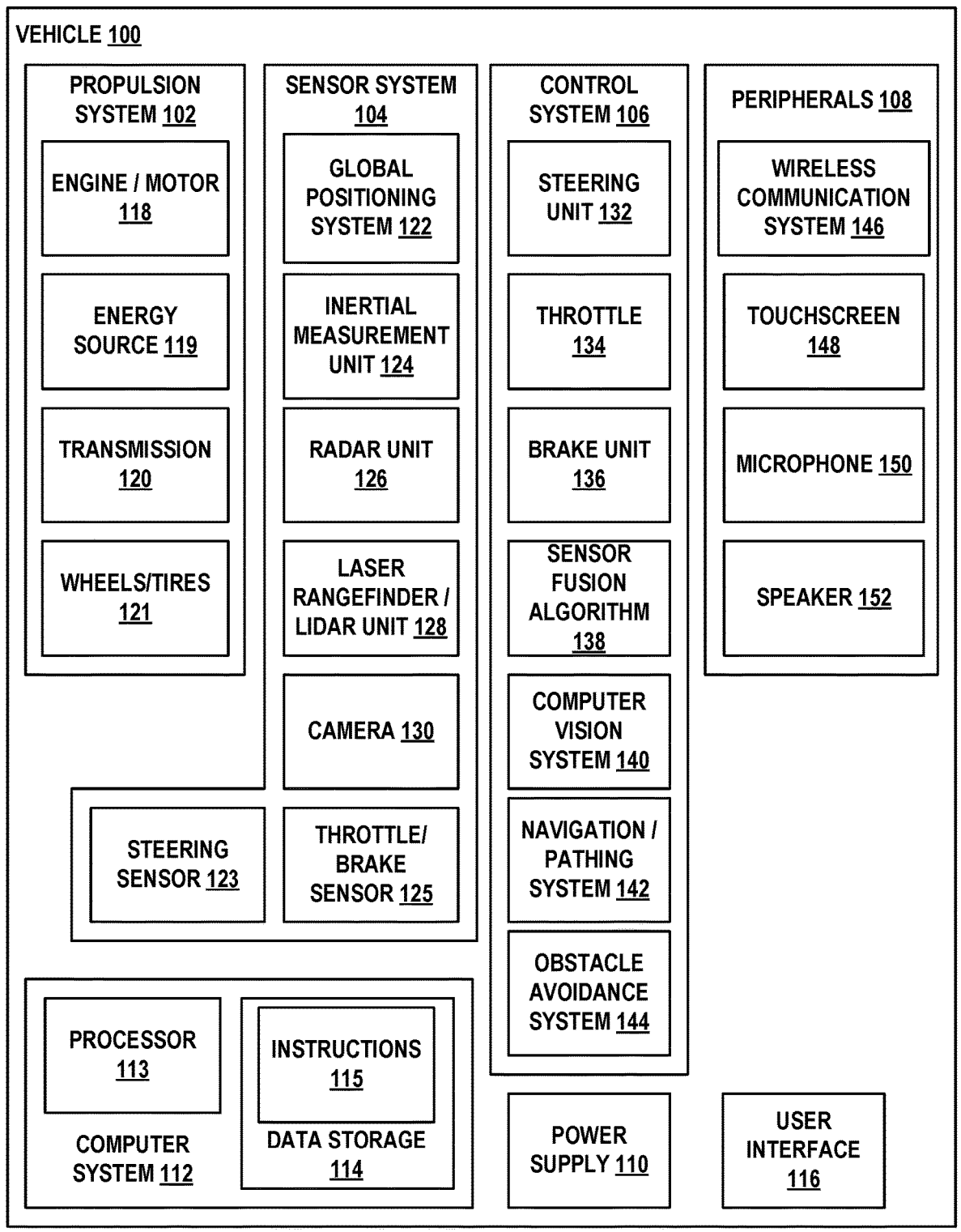
FIG. 1 illustrates a block diagram of a vehicle, in accordance with example embodiments.
Figure 2A:
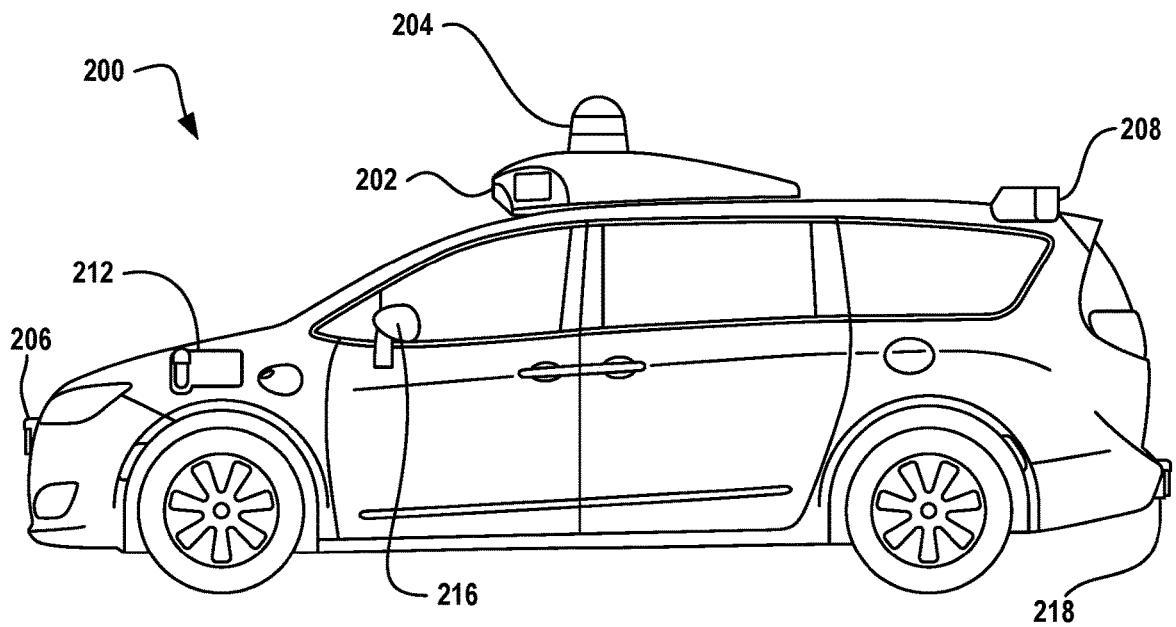
FIGS. 2A, 2B, 2C, 2D, and 2E illustrate a physical configuration of a vehicle, in accordance with example embodiments.
Figure 2B:
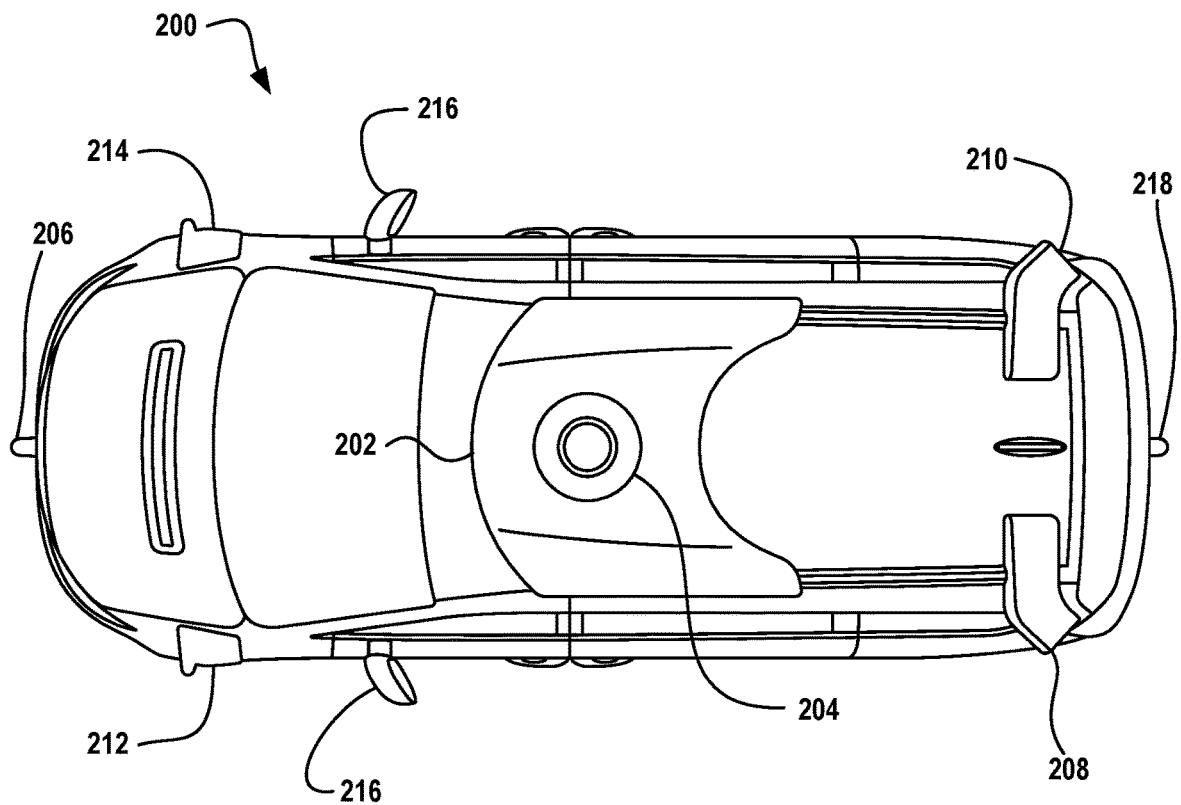
Figure 2C:
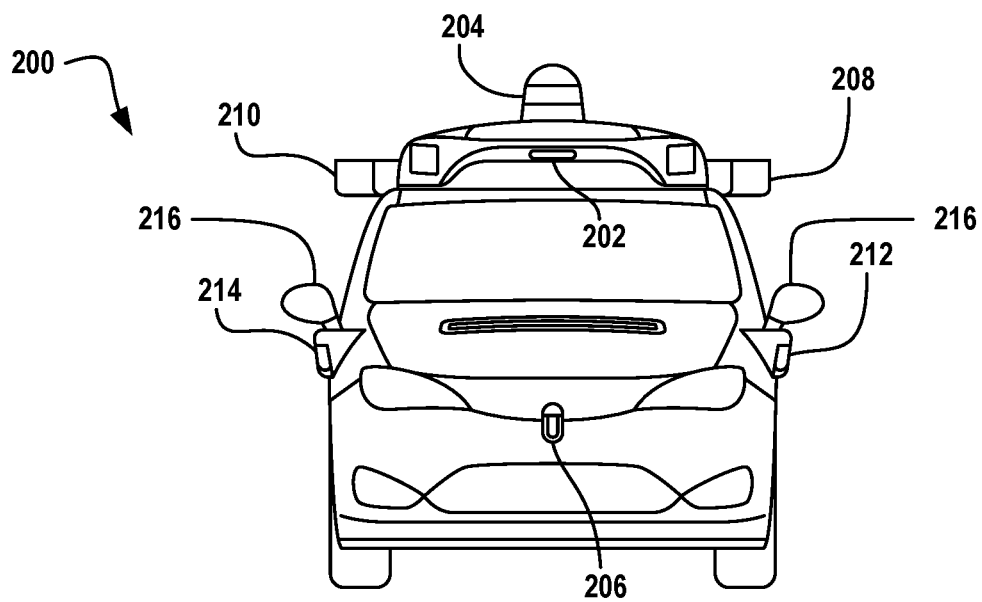
Figure 2D:
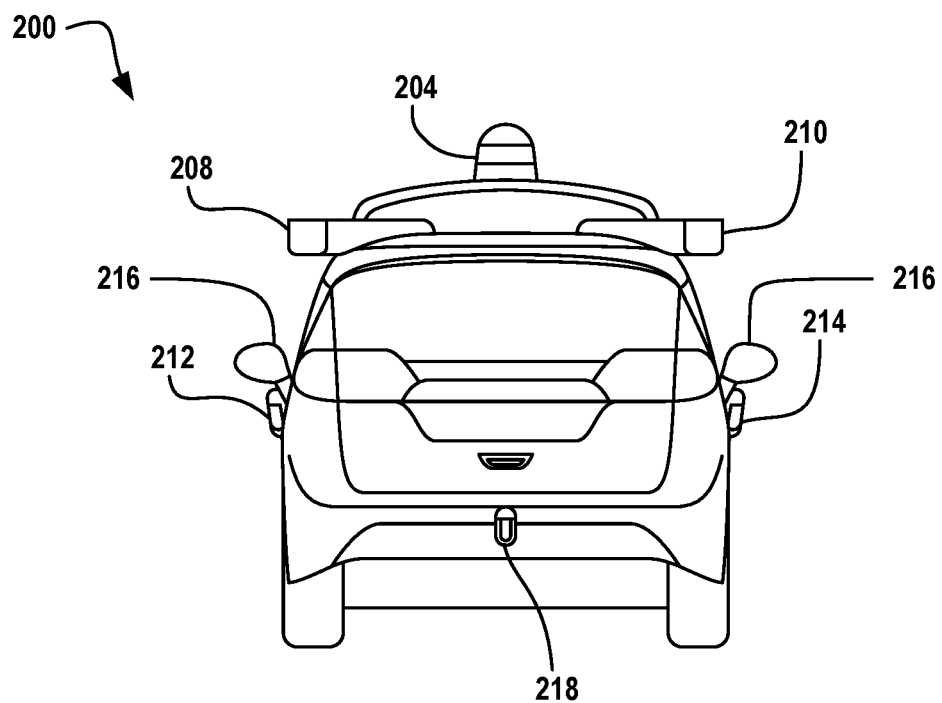
Figure 2E:
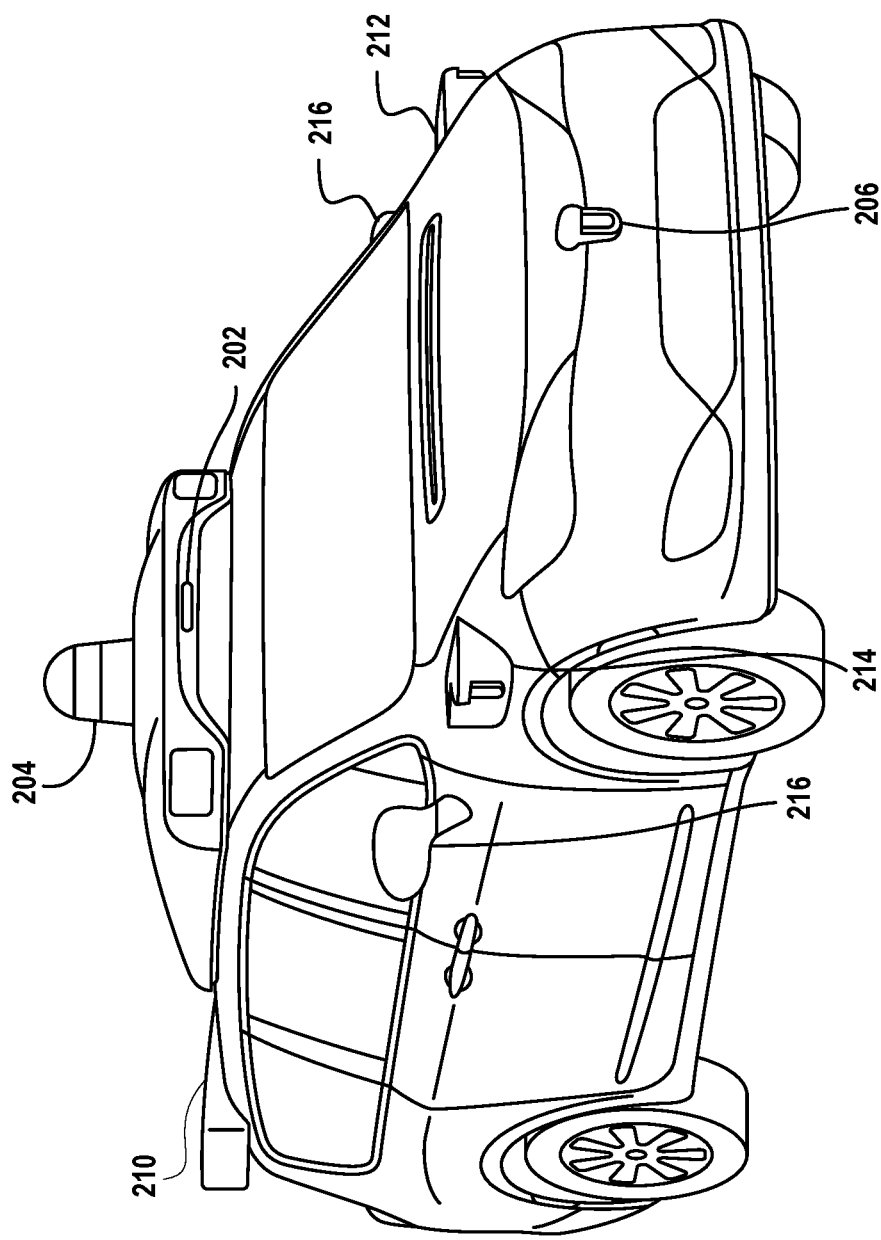

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

An autonomous vehicle may be configured to traverse an environment based on data from one or more sensors positioned thereon. These sensors may include a light detection and ranging (LIDAR) device configured to determine distances between the LIDAR device and various points within the environment. Specifically, the LIDAR device may determine the distances by projecting light pulses onto the environment and detecting corresponding return light pulses reflected from the various points within the environment. The intensity of each of the return light pulses may be measured by the LIDAR device and represented as a waveform that indicates the intensity of detected light over time. Thus, each point detected within the environment, and the physical characteristics of this point, may be represented by a corresponding waveform. Each waveform may be represented by a plurality of discrete samples.

These waveforms may be processed using various signal processing techniques and algorithms to measure the physical characteristics associated with each of the points within the environment. Such signal processing techniques and algorithms may utilize or rely on predetermined equations or expressions to measure the respective physical characteristics, properties, and/or quantities. These equations or expressions may define a relationship between one or more characteristics of the waveform and corresponding physical characteristics. In some cases, for example, the equations may be closed-form equations that can be evaluated in a finite number of operations.

For example, the amount of time between (i) projecting a light pulse and (ii) detecting a corresponding return light pulse may be used to determine the distance between the LIDAR and a particular point within the environment. As another example, the intensity of the return light pulse (e.g., relative to an intensity of the corresponding source light pulse) may be used to determine the reflectivity of a surface underlying the particular point in the environment. Other aspects of the return light pulse (e.g., a width of the return light pulse) represented by the waveform may be similarly measured and used to determine a metric of a corresponding physical characteristic of the particular point within the environment.

While these techniques or algorithms may allow for calculation of values that quantify many different physical characteristics of points within the environment, each waveform may contain therein additional details that might not be easily identified and/or measured using such predetermined algorithms or expressions. That is, the waveform may include patterns that represent the physical properties of corresponding surfaces or objects in the environment and allow these physical properties to be measured or approximated. However, for some physical properties, a predetermined algorithm that expresses a relationship between these physical properties and a particular pattern or characteristic in the waveform might not be available. In other cases, such predetermined algorithms may be available, but measuring the physical properties using these predetermined algorithms may be difficult, impractical (e.g., not fast enough), and/or computationally-expensive.

Accordingly, an embedding model may be trained to extract, from the waveform, indicia of the physical properties or characteristics associated with the corresponding point detected within the environment. The embedding model may be implemented, among other possibilities, as an artificial neural network. The embedding model may be trained to compute, for each respective point and based on the corresponding waveform, a vector representing the characteristics of the corresponding waveform and thus the respective point in the environment. Unlike the predetermined signal processing algorithms, the embedding model may express an empirically-derived relationship between waveform characteristics and physical characteristics that is based on training data used to determine the embedding model.

The vector determined by the embedding model may comprise a plurality of values that are representative of one or more characteristics of the respective waveform, and therefore also representative of the corresponding physical characteristics of the point in the environment represented by this waveform. The number of elements in the vector may be smaller than the number of samples that represent the corresponding waveform, thus resulting in the embedding model providing a dimensionality reduction. Notably, the specific physical characteristic represented by a given value within the vector might not be known, and, in fact, does not need to be known to allow the embedding model to facilitate detection and classification of various physical features within the environment.

The embedding model may be used in combination with (i) a signal processor configured to determine a map of the environment using one or more predetermined algorithms and (ii) a feature detector configured to detect or classify physical features within the environment. The map may represent therein the positions of each of the points detected within the environment. The map may be, for example, a three-dimensional point cloud, a voxel grid, or a mesh, among other possibilities. The signal processor may additionally be configured to compute, using predetermined algorithms and based on the waveform, additional values (e.g., P values) that represent some of the physical characteristics of the corresponding point within the environment. The representation of each point within the map may be associated with the corresponding additional values.

The map may be concatenated (e.g., by way of a point-wise concatenator) with the output of the embedding model. Namely, the representation of each point within the map may be additionally associated with the plurality of values (e.g., N values) that make up the vector generated for the corresponding point within the environment by the embedding model. Thus, the concatenated map may include (P+N) values associated with each point represented therein. This concatenated map may be provided as input to the feature detector, thus allowing detection of physical features within the environment based on both (i) physical characteristics computed using predetermined signal processing algorithms and (ii) values computed by the embedding model.

The feature detector may take the form of a machine learning algorithm (e.g., artificial neural network), a predetermined image, map, or model processing algorithm, or a combination thereof. The embedding model may be co-trained with the feature detector to configure the embedding model to generate vector values that are meaningful in representing the physical characteristics of the physical features that the feature detector is configured to detect. Thus, the feature detector may provide an objective way to quantify how well the values of the embedding vector generated by the embedding model represent the physical characteristics of points within the environment, thus allowing the embedding model to be refined to produce more accurate embedding vectors.

For example, the embedding model and the feature detector may be trained to detect smoke in the environment—a task that may be difficult to accomplish using predetermined signal processing algorithms. Thus, the embedding model and the feature detector may be trained using (i) a first plurality of sample waveforms representative of respective environments or portions thereof that contain smoke and (ii) a second plurality of sample waveforms representative of respective environments or portions thereof that do not contain smoke. Such training may involve backpropagation and gradient descent, among other available machine learning training algorithms, to determine parameters for the embedding model and/or the feature detector.

Accordingly, the parameters determined for the embedding model and/or the feature detector may allow for discrimination between environments or portions thereof that contain smoke and those that do not. For example, the values of particular elements of some of the vectors, or combinations of such values, determined by the embedding model for different points within the environment may indicate the presence of smoke. The feature detector may in turn be configured to determine that smoke is present within at least a portion of the environment based on the values of these particular elements of the vectors. A similar process may be used to allow the embedding model to provide indicia of a background energy level associated with a point, weather condition in the environment, presence of moisture between the LIDAR device and the respective point, presence of occlusions (e.g., translucent or semi-transparent materials) between the LIDAR device and the respective point, or material properties of a surface underlying the respective point, among other possibilities.

Determining the material properties of a particular physical feature within the environment may, for example, allow the embedding model and the feature detector to be used to determine whether this particular physical feature is traversable by a vehicle moving through the environment. Thus, the embedding model and the feature detector may be trained to distinguish between physical features that are traversable (e.g., dead leaves, trash on the road, etc.) and physical features that are not traversable (e.g., pedestrians, bicycles, large debris, etc.).

II. Example Vehicle Systems

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, laser rangefinder/LIDAR 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/LIDAR 128 may include one or more photodetectors. Such photodetectors may be especially sensitive detectors (e.g., avalanche photodiodes (APDs)). In some examples, such photodetectors may even be capable of detecting single photons (e.g., single-photon avalanche diodes (SPADs)). Further, such photodetectors can be arranged (e.g., through an electrical connection in series) into an array (e.g., as in a silicon photomultiplier (SiPM)).

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or 4G cellular communication, such as worldwide interoperability for microwave access (WiMAX) or long-term evolution (LTE). Alternatively, wireless communication system 146 may communicate with a wireless local area network (WLAN) using WiFi or other possible connections. Wireless communication system 146 may also communicate directly with a device using an infrared link, BLUETOOTH®, or ZIGBEE®, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by other systems. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first LIDAR unit 204, a second LIDAR unit 206, a first radar unit 208, a second radar unit 210, a first LIDAR/radar unit 212, a second LIDAR/radar unit 214, and two additional locations 216, 218 at which a radar unit, LIDAR unit, laser rangefinder unit, and/or other type of sensor or sensor(s) could be located on the vehicle 200. Each of the first LIDAR/radar unit 212 and the second LIDAR/radar unit 214 can take the form of a LIDAR unit, a radar unit, or both.

Furthermore, the example vehicle 200 can include any of the components described in connection with vehicle 100 of FIG. 1. The first and second radar units 208, 210 and/or the first and second LIDAR units 204, 206 can actively scan the surrounding environment for the presence of potential obstacles and can be similar to the radar 126 and/or laser rangefinder/LIDAR 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first LIDAR/radar unit 212 and the second LIDAR/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the electromagnetic spectrum, such as infrared or ultraviolet light. The camera can be a two-dimensional detector, and can optionally have a three-dimensional spatial range of sensitivity.

In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object.

The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
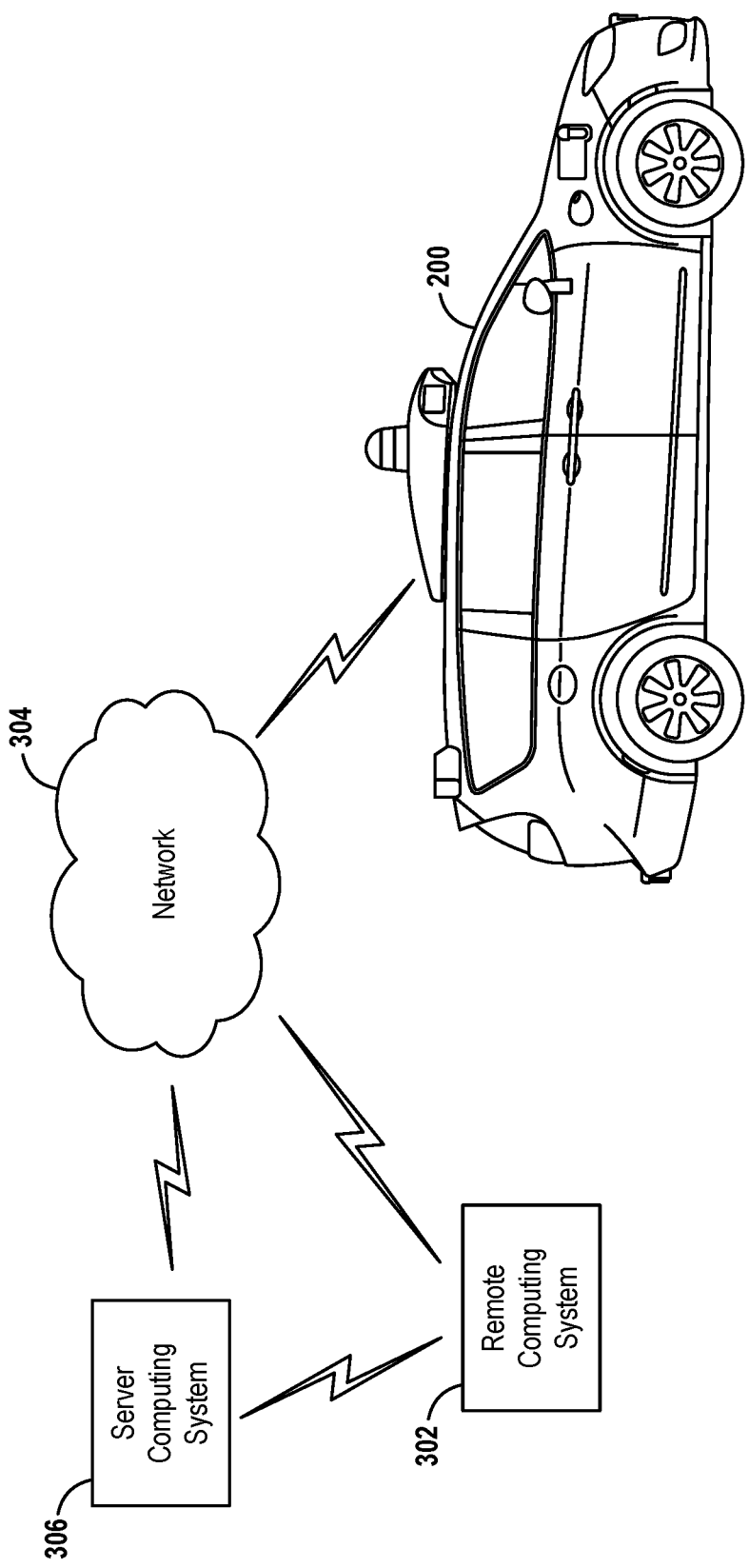
FIG. 3 illustrates wireless communication between various computing systems related to an autonomous vehicle, in accordance with example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 100 or vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation, a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a LIDAR unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

III. Example Embedding-Based Feature Detection

Figure 4A:
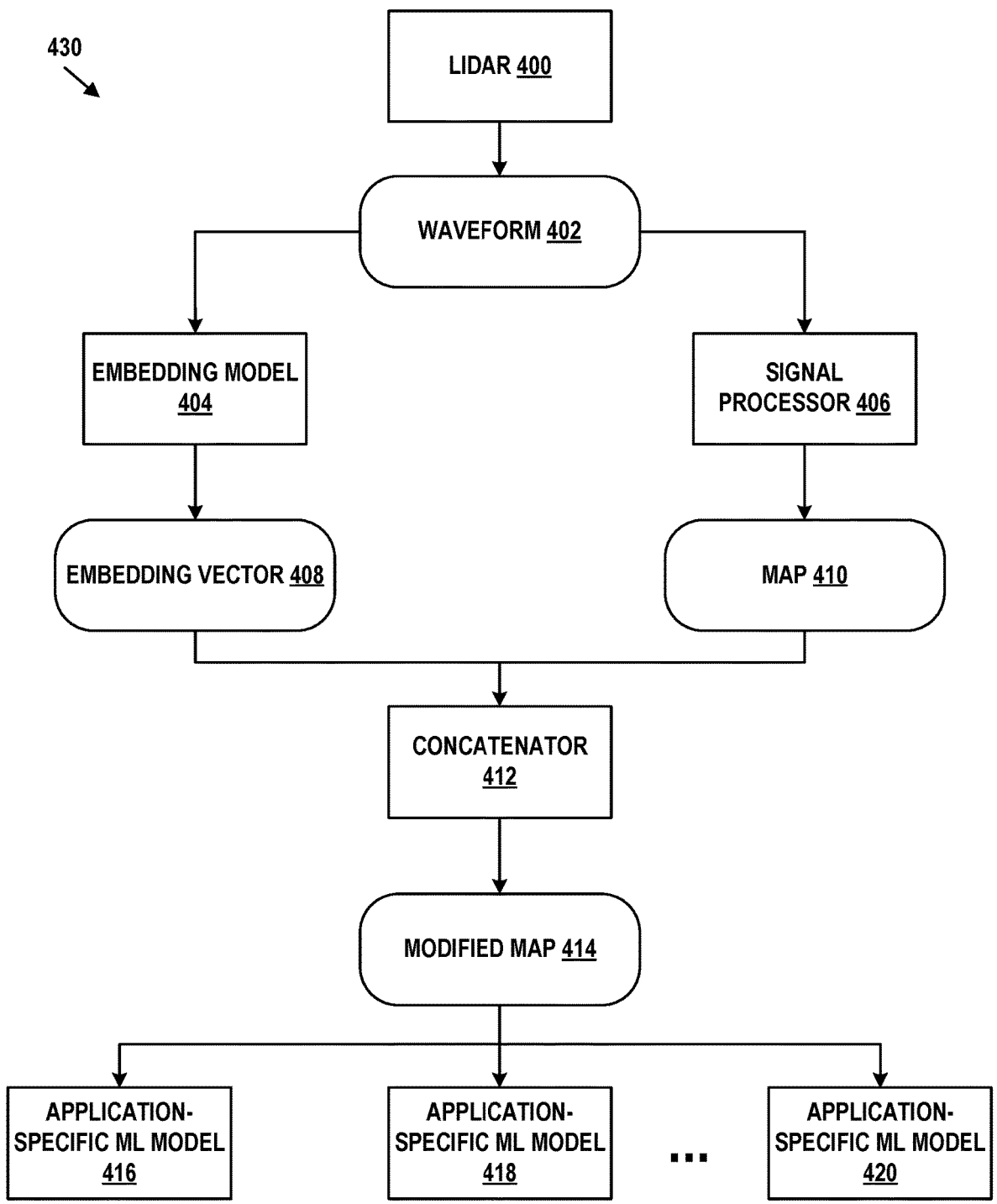
FIG. 4A illustrates a block diagram of a system, in accordance with example embodiments.

FIG. 4A illustrates example system 430 which may be used to detect physical features within an environment through which an autonomous vehicle is navigating, generate navigable paths through the environment, and perform other tasks related to allowing the vehicle to autonomously traverse the environment. System 430 includes LIDAR 400, embedding model 404, signal processor 406, concatenator 412, and application-specific machine learning (ML) models 416 and 418 through 420 (i.e., ML models 416-420).

LIDAR 400 may be configured to generate, for each respective point of a plurality of points within an environment through which the vehicle is navigating, a corresponding waveform 402. Namely, LIDAR 400 may emit source light pulses that get reflected from the respective points in the environment. The intensity of these reflected pulses (i.e., return pulses) may be measured by LIDAR 400 over time and represented in corresponding waveforms. Thus, waveform 402 is one of a plurality of different waveforms corresponding to a plurality of different points within the environment. Waveform 402 may be made up of a plurality of discrete samples of a continuous waveform generated by LIDAR 400.

Waveform 402 may represent the physical properties associated with its respective point within the environment. These physical properties may include properties of the surface underlying the respective point, as well as properties of a medium that separated LIDAR 400 from the respective point. In addition to representing the corresponding return pulse, waveform 402 may also represent the intensity of light detected by LIDAR 400 before and after the corresponding pulse is detected, thereby representing ambient/background conditions of the environment.

Waveform 402 may be provided as input to signal processor 406. Signal processor 406 may be communicatively coupled to LIDAR 400. Signal processor 406 may be implemented as software instructions executable by a processor (e.g., processor 113), as programmable circuitry (e.g., field-programmable gate arrays (FPGA)), as purpose-built circuitry (e.g., application-specific integrated circuit (ASIC)), or a combination thereof. Thus, signal processor 406 may alternatively be referred to as, for example, signal processing circuitry or a digital signal processor (DSP). Signal processor 406 may be configured to determine, based on waveform 402, a position of the respective point within map 410. Further, by determining the position of the plurality of points, signal processor 406 may generate at least a portion of map 410, which represents the environment in which LIDAR 400 is operating. Signal processor 406 may also be configured to determine, based on waveform 402, one or more other physical properties associated with the respective point, as will be discussed with respect to FIG. 5A.

Notably, signal processor 406 may be configured to determine these physical properties by way of predetermined algorithms or equations. Each of the predetermined algorithms may define a relationship between (i) a feature of waveform 402 and (ii) the corresponding physical property. Thus, the output of each of the predetermined algorithms may provide an explicit metric of a corresponding physical property, and may be human-interpretable. In some cases, the predetermined algorithms may be derived from first principles of physics, as opposed to being derived empirically, through trial-and-error, or through another example-based (e.g., supervised) learning process. In some cases, the predetermined algorithms may be entirely defined by programmers (e.g., as hard-coded relationships), rather than being defined in part by a computing device based on training data (e.g., as in the case of machine learning models).

System 430 also includes embedding model 404 that defines an embedding. Embedding model 404 may be communicatively coupled to LIDAR 400, and thus configured to receive therefrom waveform 402. Embedding model may be implemented as software instructions executable by a processor (e.g., processor 113), as programmable circuitry (e.g., FPGA), as purpose-built circuitry (e.g., ASIC), or a combination thereof. Embedding model 404 may be configured to generate embedding vector 408 based on waveform 402, as illustrated in more detail by FIG. 4B. Embedding vector 408 may include a plurality of values $X_1$–$X_N$ (i.e., $X_1$, $X_2$, $X_3$, $X_4$, $X_5$, $X_6$, $X_7$, $X_8$, $X_9$, and $X_{10}$ through $X_N$) that represent waveform 402 in an N-dimensional vector space. Thus, the embedding is a mathematical transformation that transforms the discrete samples that make up a waveform (and can be said to define a waveform space) into the N-dimensional space (e.g., vector space) defined by embedding vector 408. When the number of samples in waveform 402 exceeds the number of elements in embedding vector 408, embedding model 404 implements a dimensionality reduction that (i) preserves information indicative of physical characteristics of points in the environment and (ii) discards information that is not indicative of these physical characteristics.

Embedding model 404 may be defined empirically through training based on a plurality of sample waveforms that represent a plurality of sample points in a plurality of sample environments. Thus, embedding model 404 may be learned by a computing device, rather than being predetermined by a programmer. Accordingly, embedding model 404 may be configured to represent, through embedding vector 408, physical characteristics that might not be determinable (e.g., entirely, or under certain constraints) by signal processor 406.

Thus, values $X_1$–$X_N$ of embedding vector 408 may be representative of the physical properties associated with the respective point represented by waveform 402. In some cases, some of values $X_1$–$X_N$ may be human-interpretable. That is, some of the values may provide explicit metrics of corresponding physical properties of the respective point. In other cases, values $X_1$–$X_N$ might not be human interpretable, but may nevertheless be interpretable by, for example, application-specific models 416-420 and be used in detecting various physical features within the environment. Thus, while values $X_1$–$X_N$ might not themselves be human-interpretable, values $X_1$–$X_N$ may be combined, transformed, and/or otherwise processed by further models and/or algorithms to generate human-interpretable outputs.

Notably, at least a portion of values $X_1$–$X_N$ of embedding vector 408 may be indicative of the physical properties of the respective point that are not captured by signal processor 406. Namely, while signal processor 406 relies on several key characteristics of waveform 402 (e.g., peak time, peak height, pulse width, etc.) in determining map 410 and certain other physical properties of the points represented therein, signal processor 406 does not utilize all the information contained in waveform 402. Embedding model 404, on the other hand, captures at least a portion of the information that is not captured, extracted, or otherwise used by signal processor 406. In other words, embedding model 404 allows system 430 to use more of the information that is available in each waveform 402.

Signal processor 406 might not determine certain physical properties represented by waveform 402 for a number of reasons. In some cases, an algorithm or equation that allows for the calculation of a value associated with a particular physical property might not be known. For example, it might not be explicitly known what aspects of waveform 402 represent the particular physical property. In other cases, calculating the value associated with the particular physical property might be computationally expensive and thus undesirable or infeasible under certain resource constraints (e.g., processing time, memory, etc.), even if the algorithm or equation is known therefor. On the other hand, embedding model 404 may represent many of such physical properties through the values of embedding vector 408, thus allowing for more of the information in waveform 402 to be used by application-specific ML models 406-420.

Accordingly, a densely-sampled waveform (i.e., a waveform sampled at a high frequency) may allow embedding model 404 to generate vectors that more accurately represent the physical properties of points. Namely, the densely-sampled waveform may preserve more information than a sparsely sampled waveform. For example, such a waveform may preserve high-frequency noise that signal processor 406 ignores but that may be utilized by embedding model 404 to estimate ambient conditions or other physical properties.

Figure 4B:
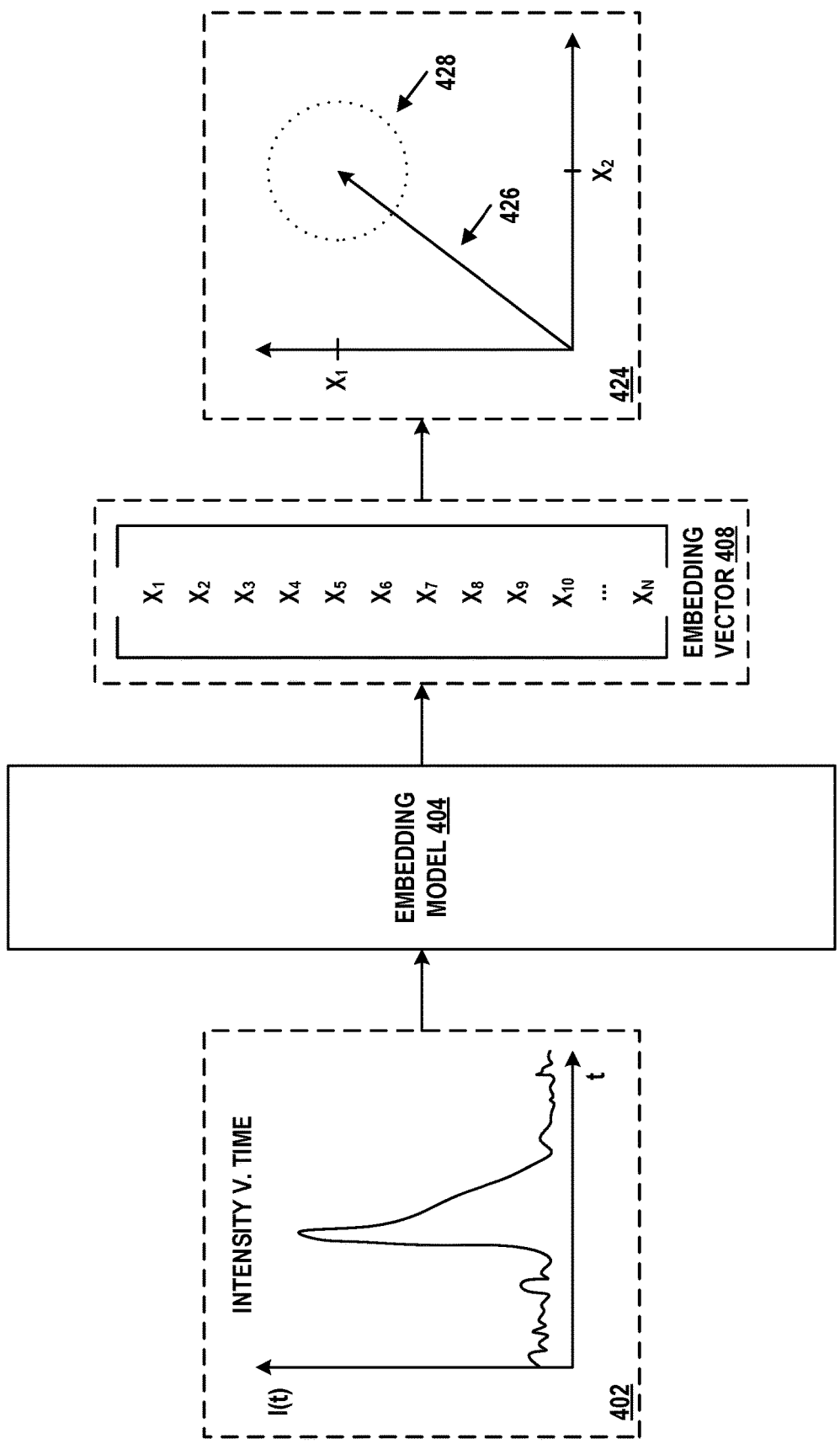
FIG. 4B illustrates an input and an output of an embedding model, in accordance with example embodiments.

Values $X_1$–$X_N$ may be used to determine the similarity of the physical properties of two different points. Namely, a distance between the corresponding embedding vectors in the N-dimensional space of the two different points (i.e., points in the physical environment, as represented by map 410) may be indicative of a similarity between the two different points. For example, when the distance is small, the physical properties of the two points may be more similar than when the distance is large. A subset of the values of the vectors may be graphed to illustrate the degree of similarity between the physical properties of the two different points. To that end, FIG. 4B illustrates graph 424 of values $X_1$ and $X_2$ of embedding vector 408 plotted along the horizontal and vertical axis, respectively.

Other vectors falling within threshold 428 of graphical representation 426 of embedding vector 408 may be considered similar in that they represent the waveforms corresponding to points that have similar underlying physical properties. Notably, although graph 424 shows only two dimensions for simplicity of illustration, the concepts herein discussed may be expanded to N-dimensions. For example, in the case of three dimensions, threshold 428 may be represented graphically as a sphere rather than a circle. In one example, the distance between two vectors may be the Euclidean distance. That is, for a first vector X1 having values $X1_1$ through $X1_N$ and a second vector X2 having values $X2_1$ through $X2_N$, the distance d may be defined as $d(X1,X2)=\sqrt{(X1_1-X2_1)^2+(X1_2-X2_2)^2+\ldots+(X1_N-X2_N)^2}$. In another example, the distance between the two vectors may be the cosine distance or another measure of distance. Thus, points having similar physical properties may generate waveforms that, when embedded in the N-dimensional space defined by embedding model 404, fall within a threshold distance of one another.

System 430 additionally includes concatenator 412 configured to combine map 410 with embedding vector 408 to generate modified map 414. Concatenator 412 may, for each respective point represented in map 410, append the values of the embedding vector corresponding to the respective point. Thus, each respective point represented in modified map 414 may be associated with a corresponding data structure that defines at least (i) coordinates of the respective point within maps 410 and/or 414, (ii) values of physical properties determined for the respective point by signal processor 406, and values of the embedding vector 408 determined for the respective point by embedding model 404. An example of the data represented by modified map 414 is illustrated in and discussed with respect to FIG. 6.

System 430 further includes application-specific ML models 416-420 ("ML models 416-420") each configured to perform corresponding operations related to detection and/or classification of physical features within the environment and/or other operations related to navigation of the autonomous vehicle. One or more of ML models 416-420 may constitute, and may thus be referred to as, a feature detector. Each of ML models 416-420 may be communicatively coupled to embedding model 404 and signal processor 406 (e.g., by way of concatenator 412). ML models 416-420 may be implemented as software instructions executable by a processor (e.g., processor 113), as programmable circuitry (e.g., FPGA), as purpose-built circuitry (e.g., ASIC), or a combination thereof. ML models 416-420 may be configured to determine and/or classify, based on modified map 414, one or more physical features within the environment.

For example, ML models 416-420 may be configured to identify pedestrians, traffic signals and signs, roadways, vegetation, and other environmental features such as mailboxes, benches, garbage cans, sidewalks, and/or any other object within the environment that may be of interest to the operation of the autonomous vehicle. As another example, ML models 416-420 may be configured to determine that a physical feature constitutes an occlusion that prevents LIDAR 400 from viewing and/or acquiring data about one or more other objects or physical features disposed behind the occlusion. As a further example, ML models 416-420 also may, based on the detected physical features, plan a trajectory that defines at least a path and velocity for the vehicle to follow, and/or predict the trajectories of other mobile occupants of the environment.

Regardless of the specific operations carried out by ML models 416-420, the models may utilize embedding vector 408 to operate more accurately and/or perform operations that would not be performable without the additional information represented by embedding vector 408. Namely, rather than relying on map 410, ML models 416-420 may rely on modified map 414 to detect physical features, plan the vehicle trajectory, and perform other operations related to vehicle navigation. Thus, ML models 416-420 take into account not only information that can be calculated by signal processor 406 using predetermined equations, but also the other information stored in waveform 402 and represented by embedding vector 408. Accordingly, system 430 is less wasteful of waveform information than other systems that do not utilize embedding model 404.

In some implementations, ML models 416-420 and embedding model 404 may be trained independently. For example, embedding model 404 may be determined first, and ML models 416-420 may be subsequently trained to utilize the vectors generated by embedding model 404 to accurately accomplish their respective tasks. In other implementations, one or more of ML models 416-420 may be co-trained with embedding model 404. For example, embedding model 404 may be trained to map waveform samples to the N-dimensional vectors while ML model 416 is simultaneously trained to utilize the vectors to, for example, detect smoke within the environment. ML model 416 may thus provide an objective metric of whether embedding vector 408 is useful in performing the specific task of ML model 416 (i.e., smoke detection). Parameters of embedding model 404 and of ML model 416 may be iteratively adjusted until smoke can be successfully detected within sample environments that neither model has previously trained on. As embedding model 404 is co-trained with a larger number of ML models, the values of the embedding vectors may come to more accurately and efficiently represent the physical characteristics used by the ML models.

Embedding model 404 may be trained or defined by way of, for example, pointwise mutual information, matrix factorization, principal component analysis, and/or backpropagation. The specific manner in which embedding model 404 is trained may depend on the structure of the model. For example, implementing embedding model 404 as an artificial neural network may involve training of the artificial neural network by way of backpropagation. Additionally, embedding model 404 may be trained such that the information of embedding vector 408 is not redundant with the information determined by signal processor 406. For example, since ML models 416-420 utilize the data (e.g., data in map 410) generated by signal processor 406, when embedding model 404 is co-trained with one or more of ML models 416-420, redundancy may be reduced and/or eliminated by the training process.

Notably, embedding model 404 may be trained such that embedding vector 408 is usable and useful for multiple different and distinct tasks. Namely, the values of embedding vector 408 may be usable and useful for each of the tasks carried out by ML models 416-420. For example, the values of embedding vector 408 may be used to distinguish between environments that do and do not contain smoke, as well as determine whether an object does or does not constitute vegetation, among a plurality of other possible tasks. Such an embedding vector may be useful, for example, is a system that lacks sufficient network bandwidth and/or computing resources to create multiple different embedding vectors (e.g., J embedding vectors) for multiple different tasks (e.g., J different tasks).

In some implementations, however, embedding model 404 may be configured to generate multiple different embedding vectors, each of which may be specific to one or more tasks or objectives. Thus, any of the operations or embodiments herein discussed may generate and/or use one or more embedding vectors. For example, a different embedding vector may be generated by embedding model 404 (and/or one or more additional embedding models) for each of application-specific ML models 416-420, with each embedding vector being specific to the particular task or objective of the corresponding ML model.

Figure 5A:
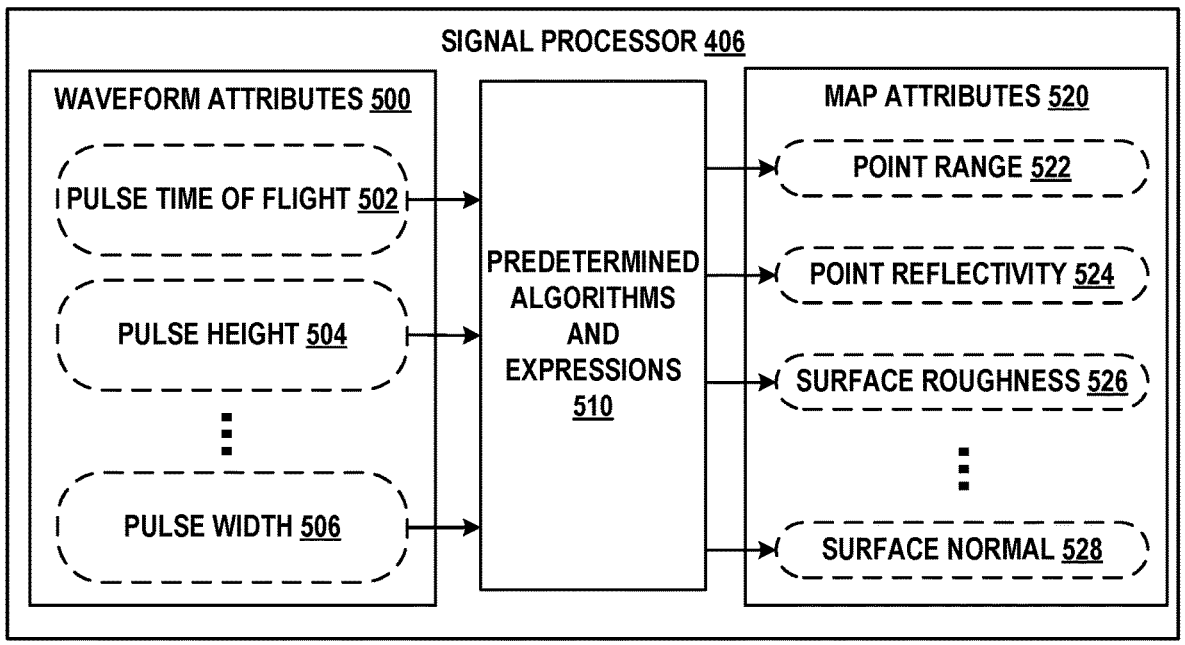
FIG. 5A illustrates aspects of a signal processor, in accordance with example embodiments.
Figure 5B:
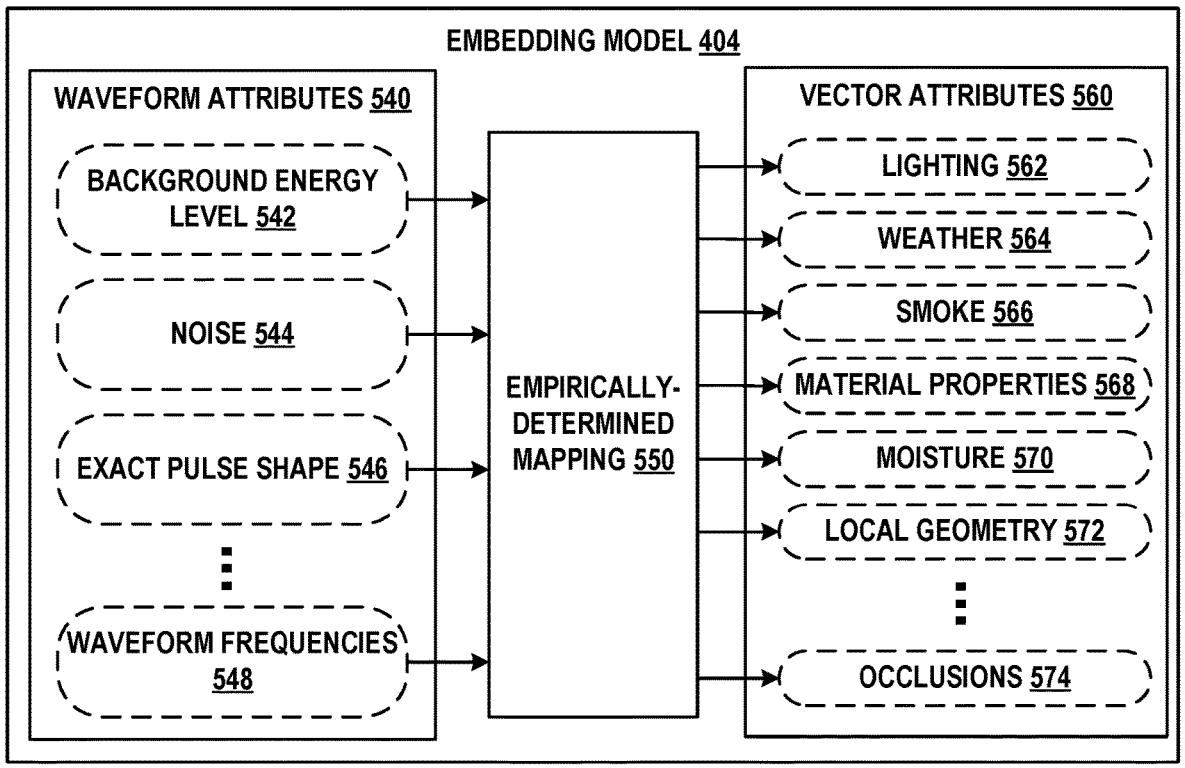
FIG. 5B illustrates aspects of an embedding model, in accordance with example embodiments.

FIGS. 5A and 5B illustrate examples of the physical properties (i.e., characteristics) of points determined by signal processor 406 and embedding model 404, respectively. Signal processor 406 may be configured to determine map attributes 520 based on waveform attributes 500 by using predetermined algorithms and/or expressions 510. For example, pulse time of flight 502 may be related to point range 522 (i.e., the distance between the respective point and LIDAR 400). Namely, pulse time of flight 502 may be the difference in time between detection of the peak of the pulse (i.e., the time at which a derivative of the peak in waveform 402 reaches zero) and transmission of its corresponding source light pulse. Thus, point range 522 may be the product of (i) the speed of light in air with (ii) pulse time of flight 502.

Similarly, point reflectivity 524 and pulse height 504 may be related through another predetermined equation. For example, point reflectivity 524 may be defined by the quotient of (i) pulse height 504 (i.e., return pulse height) and (ii) a pulse height of its corresponding source light pulse. As another example, point reflectivity 524 may be defined by the quotient of (i) a first integral of the return pulse and (ii) a second integral of the corresponding source light pulse. In other words, point reflectivity 524 may indicate the fraction of the source light pulse that was reflected back at LIDAR 400, as represented by pulse height 504 or by the integral of the pulse.

In a further example, pulse width 506 (e.g., full width at half of pulse peak) may be used to estimate surface roughness 526. Low pulse width 506 may be indicative of smooth surfaces that do not cause a large degree of photon scattering. On the other hand, high pulse width 506 may be indicative of rough surfaces that cause a large degree (i.e., an amount that exceeds a predetermined threshold) of photon scattering, resulting in multiple photon return paths. Pulse width 506 may thus be proportional to surface roughness.

In addition to determining the attributes of individual points, signal processor 406 may also be configured to determine attributes of surfaces underlying groups of multiple points. For example, signal processor 406 may be configured to determine a surface normal 528 for surfaces within map 410. Signal processor 406 may accomplish this by, for example, fitting a plane to a group of three or more points that represent the surface and subsequently determining the normal of (i.e., a vector perpendicular to) this plane.

On the other hand, embedding model 404 may implement empirically-determined mapping 550 that relates waveform attributes 540 of waveform 402 to vector attributes 560 of embedding vector 408. Notably, embedding model 404 may utilize the entirety of waveform 402 (i.e., all samples thereof), which may contain therein all the raw information (or at least as much as remains after sampling of the original continuous-domain signal) indicative of the physical characteristics of the corresponding point. As a result, waveform attributes 540 may include all other attributes of waveform 402 that are not included in waveform attributes 500 utilized by signal processor 406. Such mutual exclusion between attributes 500 and 540 may be achieved through the training process. However, in some implementations, there may be overlap between attributes 500 and 540.

Waveform attributes 540 may include, for example, background energy level 542, noise 544, exact pulse shape 546, and waveform frequencies 548, among other attributes. Vector attributes 560 may represent lighting 562 in the environment, weather conditions 564 in the environment, presence of smoke 566 in the environment, material properties 568 of the respective point represented by waveform 402, presence of moisture 570 between LIDAR 400 and the respective point, local geometry 572 associated with the respective point (e.g., local surface normal of the point), and presence of any occlusions 574 (e.g., translucent or semitransparent materials between LIDAR 400 and the respective point), among other aspects.

In some cases, one of vector values $X_1$-$X_N$ may represent a corresponding one of vector attributes 560 (e.g., $X_5$ may indicate the presence of smoke 566). In such a case, this vector value may be considered human-interpretable. In other cases, vector values $X_1$-$X_N$ might not directly represent any of vector attributes 560. Instead, one or more of vector values $X_1$-$X_N$ may need to be combined and/or mathematically transformed (e.g., by application-specific ML models 416-420) in order to provide a direct measure of a corresponding one or more of vector attributes 560. Thus, for example, vector values $X_1$, $X_6$, and $X_7$ may be used by ML model 418 to determine the amount of moisture 570 present between LIDAR 400 and the respective point within the environment. In such cases, these vector values might not be considered human-interpretable. Nevertheless, vector values $X_1$-$X_N$ may each be machine-interpretable and thus usable for various operations of an autonomous vehicle.

In some embodiments, embedding model 404 may be configured to generate embedding vector 408 based on (i) waveform 402 representing the return pulse and (ii) an additional waveform representing the source pulse that resulted in the return pulse. That is, embedding model 404 may consider the characteristics of the light pulse that was transmitted at the environment as well as how the physical characteristics of the environment altered this light pulse. Such an approach may allow embedding vector 408 to more accurately represent the physical characteristics of each point, especially in cases where source pulse characteristics may have some degree of variability among different source pulses.

IV. Example Modified Map

FIG. 6 illustrates a tabular representation of the data that may define modified map 414. Modified map 414 may represent therein M different points detected within the environment, as defined by point index 600. Each point may be associated with a first plurality of data (e.g., P values), indicated with dashed outlines, determined by signal processor 406. The first plurality of data may define, for each of the M points, map coordinates 602, reflectivity 604, and surface normal 606, among other attributes. Thus, in some cases, the first plurality of data may define each of map attributes 520.

Map coordinates 602 may include, for each of the M points, values $X_i$, $Y_i$, and $Z_i$ representing the position of the respective point along the x, y, and z axes of map 410, respectively, where i represents the corresponding point index 600. Reflectivity 604 may include, for each of the M points, value $R_i$ representing, for example, the percentage of the source pulse reflected back and detected by LIDAR 400. Surface normal 606 may include, for each of the M points, values $NX_i$, $NY_i$, and $NZ_i$ representing the normal vector of the respective point along the x, y, and z axes of map 410, respectively.

Each point in modified map 414 may also be associated with a second plurality of data (e.g., N values), indicated with a hashed background, determined by embedding model 404. The second plurality of data may define, for each of the M points, the values associated with each dimension of embedding vector 408. That is, each of the M points may be associated with N values, including values associated with first embedding dimension 608 and second embedding dimensions 610 through Nth embedding dimension 612. Each of dimensions 608-612 may define a corresponding value $X_{i,j}$, for each of the M points, where i represents the dimension of embedding vector 408 and ranges from 1 to N, and where j represents point index 600 and ranges from 1 to M. Thus, the second plurality of data may be representative of vector attributes 560.

Modified map 414 may thus include (P+N) values, or channels, associated with each point represented thereby. The value of each channel may be utilized by the feature detector (e.g., ML models 416-420) to identify and classify physical features in the environment and thus facilitate operation of the autonomous vehicle.

V. Example Embedding Model Implementation

Figure 7:
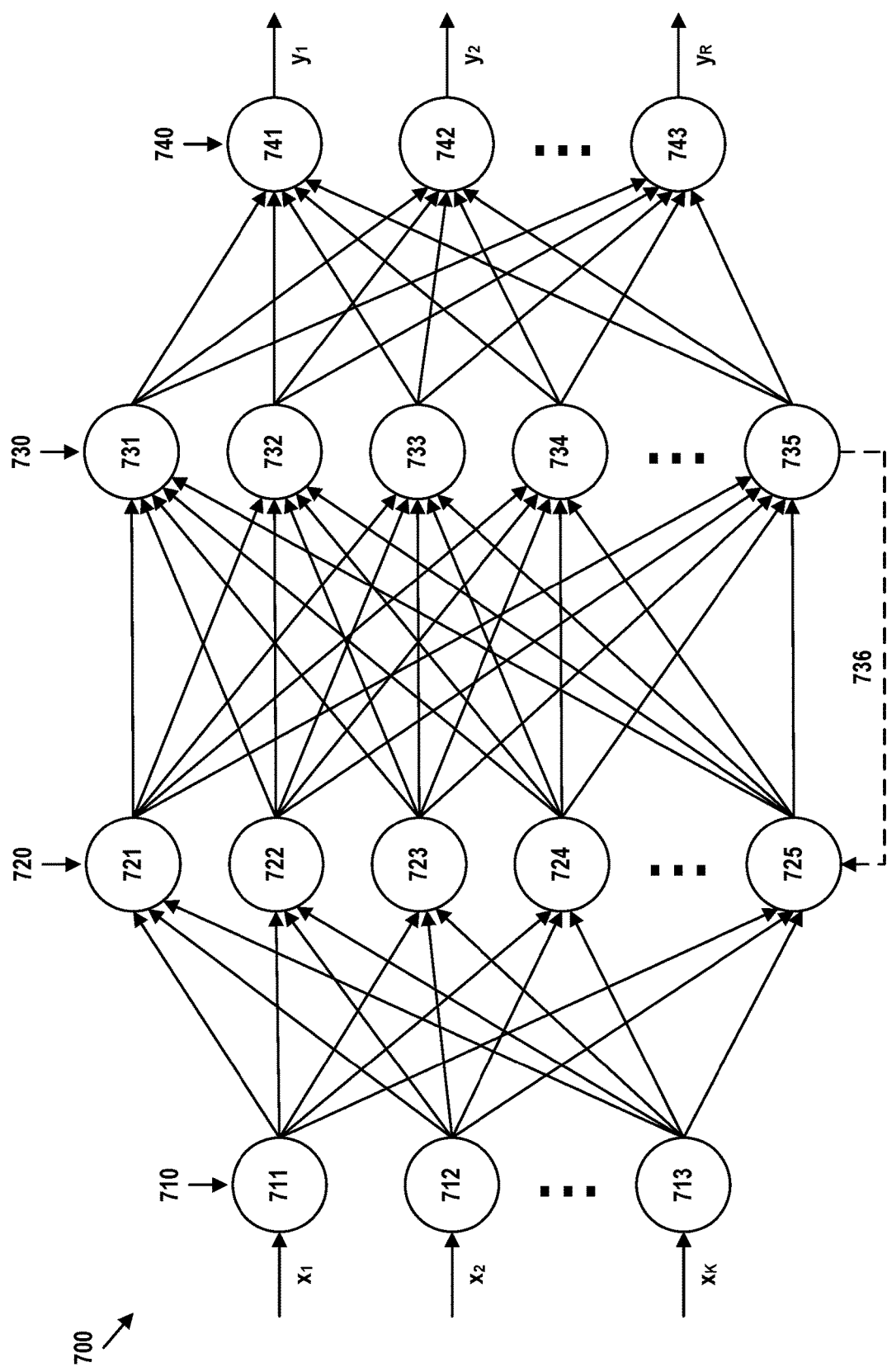
FIG. 7 illustrates a machine learning model, in accordance with example embodiments.

FIG. 7 illustrates artificial neural network (ANN) 700, which provides an example implementation of embedding model 404 and/or ML models 416-420. ANN 700 may include input nodes 711, 712, and 713 that form part of input layer 710 of ANN 700 and are configured to accept inputs $x_1$ and $x_2$ through $x_K$, respectively. In the case of embedding model 404, for example, the number of inputs K may be equal to the number of samples in waveform 402. Thus, when a waveform with S discrete samples, K may be equal to S. In the case of ML models 416-420, for example, the number of inputs K may be equal to the number of channels (P+N) in modified map 414.

ANN 700 may additionally include a plurality of hidden nodes that form part of one or more hidden layers 720 and 730. Hidden nodes 721, 722, 723, 724 and 725 may form first hidden layer 720 while hidden nodes 731, 732, 733, 734, and 735 may form second hidden layer 730. In some examples, ANN 700 may include additional hidden nodes and additional hidden layers not shown herein. The number of hidden nodes and hidden layers may be determined empirically during training of ANN 700 to achieve an ANN that generates waveform embeddings with a satisfactory accuracy (i.e., an accuracy greater than a threshold accuracy).

Notably, the terms "hidden node" and "hidden layer" are used herein to designate nodes and layers, respectively, located between the input and output layers of the ANN. These and similar terms are not to be construed as implying that values, functions, or other properties associated with the hidden nodes or layers are necessarily unknown.

ANN 700 may further include output nodes 741, 742, and 743 that form part of an output layer 740 of ANN 700. Output nodes 741 and 742 through 743 may be configured to provide outputs $y_1$ and $y_2$ through $y_R$, respectively. In the case of embedding model 404, each of output nodes 741 and 742 through 743 may provide a corresponding one of the values of embedding vector 408 (e.g., output node 741 may provide the value of $X_1$, output node 742 may provide the value of $X_2$, and output node 743 may provide the value of $X_N$).

The nodes of ANN 700 may be connected with one another, as illustrated by the arrows in FIG. 6. For example, input nodes 711-713 may be connected to hidden nodes 721-725 of the first hidden layer 720 (i.e., input layer 710 may be connected to hidden layer 720), hidden nodes 721-725 may be connected to hidden nodes 731-735 of the second hidden layer 730 (i.e., hidden layer 720 may be connected to hidden layer 730), and hidden nodes 731-735 may be connected to output nodes 741-743 (i.e., hidden layer 730 may be connected to output layer 740). In some embodiments, each node of a layer may be connected to each node within a subsequent layer (e.g., node 724 may be connected to each of nodes 731-735). Alternatively, some nodes within a layer may be unconnected to one or more nodes within a subsequent layer. Some nodes may additionally be provided with a constant bias signal (not shown).

One or more of the hidden nodes may represent feature filters configured to filter the input waveform for specific features (e.g., waveform attributes 540). The filters may become increasingly complex, filtering for higher-order features, as the hidden nodes of ANN 700 are traversed.

In further embodiments, nodes within a layer may be connected back to nodes within a previous layer or within the same layer. For example, node 735 within layer 730 may be connected to node 725 within prior layer 720 by way of connection 736. In another example, node 735 within layer 730 may be connected to at least one of nodes 731, 732, 733, or 734 within layer 730 (not shown). Thus, ANN 700 may include feedback that creates internal state within the network. This type of ANN may be referred to as a recurrent artificial neural network (RANN). Notably, an ANN without any feedback paths may be referred to as a feedforward artificial neural network (FF-ANN).

Each connection between nodes of ANN 700 may be associated with a respective weighting value. A given node may receive inputs $a_1$, $a_2$, through $a_k$. Each of inputs $a_1$, $a_2$, through $a_k$ may be associated with corresponding weighting values $w_1$, $w_2$, through $w_k$, respectively. The given node may operate by first taking the sum of the respective products of each input multiplied by the corresponding weighting value. The given node may thus compute the sum $\varphi = w_1 a_1 + w_2 a_2 + \ldots + w_k a_k$. The sum $\varphi$ may then be passed through an activation function to produce the output of the given node. Example activation functions may include a linear activation function where the node output is linearly proportional to the sum $\varphi$, a Gaussian activation function where the node output is normally distributed along a bell curve according to the sum $\varphi$, a sigmoidal activation function where the sum $\varphi$ is mapped to a bounded range of node outputs, or a Rectified Linear Units (RELu) function where the node output is max $(0, \varphi)$.

In some embodiments, ANN 700 may be or may include therein aspects of a convolutional artificial neural network (CANN). For example, ANN 700 may include pooling layers (i.e., downsampling layers) between layers 710, 720, 730, and 740. Further, ANN 700 may additionally include aspects of probabilistic neural networks, time-delay neural networks, regulatory feedback neural networks, and spiking neural networks, among other types of neural networks not herein discussed.

The output of the given node may be provided as input to other nodes within ANN 700. At each respective node to which the output of the given node is connected, this output may be multiplied by a corresponding weighting value and summed along with other inputs to the respective node. For example, the output of node 721 may be provided to node 735. The output of node 721 may be multiplied by a weighting value associated with the connection between node 721 and 735. This product may then be summed at node 735 along with the product of the output of node 722 and the weighting value between node 722 and node 735, the product of the output of node 723 and the weighting value between node 723 and node 735, the product of the output of node 724 and the weighting value between node 724 and node 735, and the product of the output of node 725 and the weighting value between node 725 and node 735. The sum may be passed through an activation function to determine the output of node 735. The output of node 735 may then be provided to nodes 741, 742, and 743.

The weighting values between interconnected nodes may be determined by training ANN 700 based on a plurality of sample waveforms representing points within environments that contain known features of conditions. The training of ANN 700 may be performed by, for example, backpropagation (e.g., classical backpropagation, backpropagation with momentum, Gauss-Jacobi backpropagation, Gauss-Seidel backpropagation, etc.). ANN 700 also provides an example implementation of one or more of application-specific ML models 416, 418, and 420.

VI. Additional Example Operations

Figure 8:
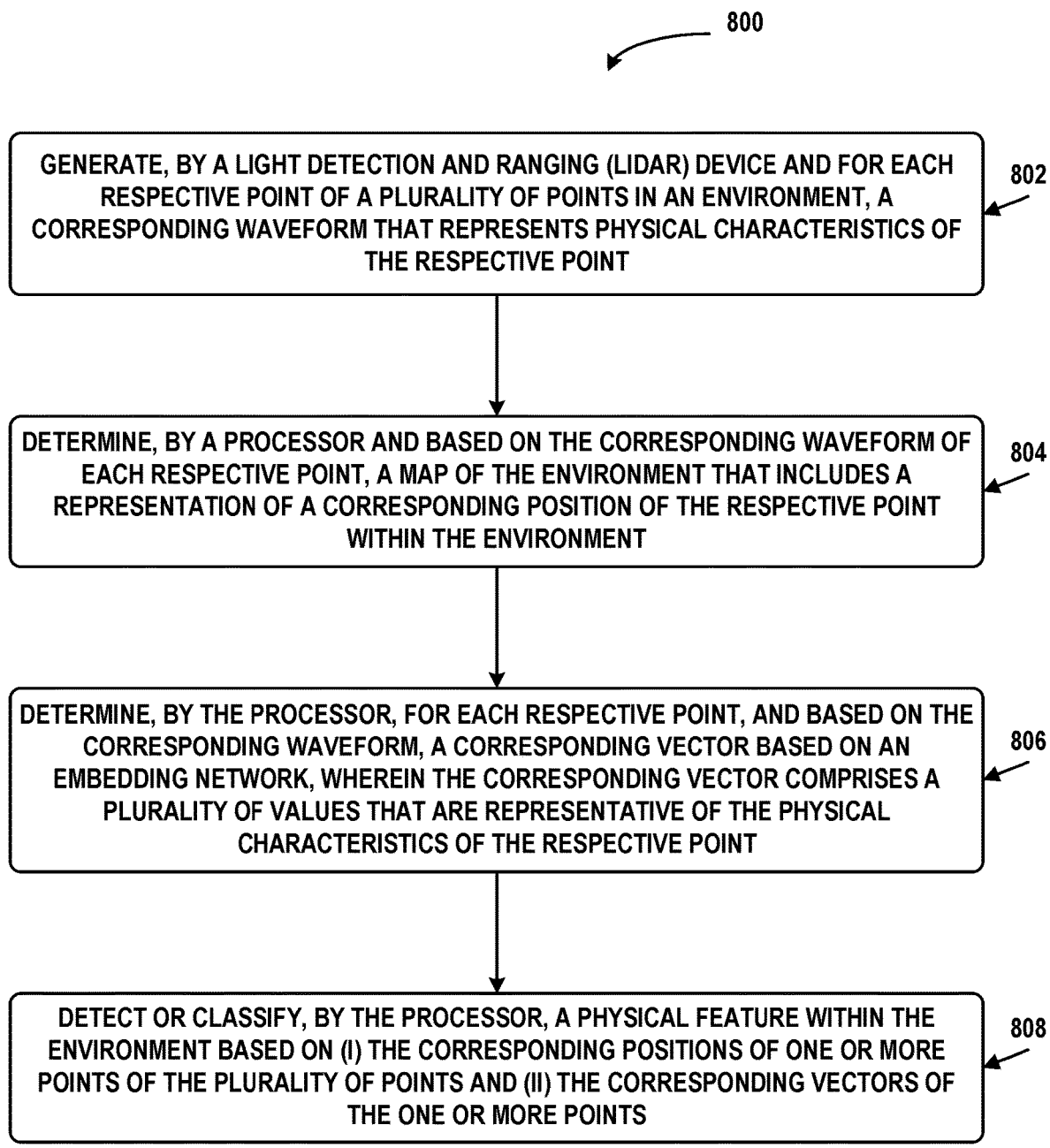
FIG. 8 illustrates a flow chart, in accordance with example embodiments.

FIG. 8 illustrates flow chart 800 of operations related to using an embedding model to identify physical features within an environment. The operations may be used with any of vehicle 100 or 200, server computing system 306, remote computing system 302, or system 430. The operations may be carried out by, for example, control system 106, computer system 112, or circuitry that is configured to perform the operations.

Block 802 involves generating, by a light detection and ranging (LIDAR) device and for each respective point of a plurality of points in an environment, a corresponding waveform that represents physical characteristics of the respective point.

Block 804 involves determining, by a processor and based on the corresponding waveform of each respective point, a map of the environment that includes a representation of a corresponding position of the respective point within the environment. In some embodiments, the operations of block 804 may be performed by a signal processor (e.g., signal processor 406) implemented as hardware and/or software.

Alternatively or additionally, the map may include a representation of the respective point at a corresponding position within the map. That is, the map, which may be a virtual representation of the physical environment, may represent therein (e.g., at one or more coordinates of the map) a physical position of the respective point within the physical environment. The relative position of the respective point with respect to other points or objects within the physical environment may be preserved and represented by the map.

Block 806 involves determining, by the processor, for each respective point, and based on the corresponding waveform, a corresponding vector based on (e.g., by way of or using) an embedding model. The corresponding vector includes a plurality of values that are representative of the physical characteristics of the respective point.

Block 808 involves detecting or classifying, by the processor, a physical feature within the environment based on (i) the corresponding positions of one or more points of the plurality of points and (ii) the corresponding vectors of the one or more points. In some embodiments, the operations of block 808 may be performed by a feature detector (e.g., application-specific ML models 416, 418, or 420) implemented as hardware and/or software.

In some embodiments, the embedding model may define a relationship between characteristics of the corresponding waveform and the physical characteristics of the respective point.

In some embodiments, the relationship may be determined such that, when the physical characteristics of a first respective point have at least a threshold degree of similarity to the physical characteristics of a second respective point, the corresponding vector of the first respective point is within a threshold distance of the corresponding vector of the second respective point.

In some embodiments, the plurality of values of the corresponding vector may include n values, the corresponding waveform of the respective point may include m sample values, and m may be greater than n.

In some embodiments, the embedding model may include an artificial neural network.

In some embodiments, the LIDAR device may be configured to (i) transmit a plurality of source light pulses towards the environment, (ii) receive a plurality of return light pulses reflected from the environment, and (iii) generate, for each respective return light pulse of the plurality of return light pulses, the corresponding waveform of the respective point of the plurality of points. The respective return light pulse may represent the physical characteristics of the respective point.

In some embodiments, the embedding model may be configured to determine the corresponding vector for each respective point further based on an additional waveform that represents a source light pulse corresponding to the respective point.

In some embodiments, the signal processor may be further configured to determine, for each respective point and based on the corresponding waveform, an additional value representing a particular physical characteristic of the physical characteristics of the respective point. The additional value may be computed using a predetermined algorithm that defines a relationship between one or more characteristics of the corresponding waveform and the particular physical characteristic.

In some embodiments, the physical characteristics of the respective point may include presence of an occlusion between the LIDAR device and the respective point. A combination of one or more values of the plurality of values that are representative of the physical characteristics of the respective point may indicate an extent of the occlusion between the LIDAR device and the respective point.

In some embodiments, the physical characteristics of the respective point may include presence of smoke between the LIDAR device and the respective point. A combination of one or more values of the plurality of values that are representative of the physical characteristics of the respective point may indicate a density of the smoke between the LIDAR device and the respective point.

In some embodiments, the physical characteristics of the respective point may include presence of moisture between the LIDAR device and the respective point. A combination of one or more values of the plurality of values that are representative of the physical characteristics of the respective point may indicate an extent of the moisture between the LIDAR device and the respective point.

In some embodiments, a concatenator may be configured to modify the map by appending, for each respective point, the plurality of values of the corresponding vector to a representation of the respective point in the map. The feature detector may be configured to detect or classify the physical feature based on the modified map received from the concatenator.

In some embodiments, the feature detector may include a machine learning (ML) model. The embedding model and the ML model may be trained to detect or classify the physical feature based on (i) a first plurality of sample waveforms that represent a first plurality of sample environments that contain the physical feature and (ii) a second plurality of sample waveforms that represent a second plurality of sample environments that do not contain the physical feature.

In some embodiments, the feature detector may include a plurality of machine learning (ML) models each configured to classify the physical feature by determining a suitability of a portion of the environment containing the physical feature for performance of one of a plurality of tasks by a vehicle.

In some embodiments, a vehicle may be configured to move through the environment. The feature detector may be configured to classify the physical feature by determining whether the physical feature is traversable by the vehicle based on the corresponding vectors of the one or more points of the plurality of points.

In some embodiments, a control system of the vehicle may be configured to, based on the feature detector indicating that the physical feature is traversable by the vehicle, causing the vehicle to drive over the physical feature. The control system may also be configured to, based on the feature detector indicating that the physical feature is not traversable by the vehicle, causing the vehicle to drive around the physical feature.

In some embodiments, the map may include a three-dimensional point cloud.

In some embodiments, the feature detector may be configured to determine that the physical feature occludes at least one other physical feature within the environment from a view of the LIDAR device.

VII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
  a light detection and ranging (LIDAR) device configured to generate, for each respective point of a plurality of points in an environment, a corresponding waveform that represents physical characteristics of the respective point;
  a signal processor communicatively coupled to the LIDAR device and configured to determine, based on the corresponding waveform of each respective point, a map of the environment that includes a representation of a corresponding position of the respective point within the environment;
  an embedding model comprising a machine learning (ML) model, communicatively coupled to the LIDAR device, and configured to (i) receive, from the LIDAR device, the corresponding waveform of each respective point as input and (ii) determine, for each respective point and by processing the corresponding waveform of the respective point by the ML model, a corresponding embedding vector comprising a plurality of values that represent the physical characteristics of the respective point in a vector space defined by the embedding model; and
  a feature detector communicatively coupled to the embedding model and configured to detect or classify a physical feature within the environment based on (i) the corresponding positions of one or more points of the plurality of points and (ii) the corresponding embedding vectors of the one or more points.

2. The system of claim 1, wherein the plurality of values of the corresponding embedding vector comprises n values, wherein the vector space is an n-dimensional vector space, wherein the corresponding waveform of the respective point comprises m sample values, and wherein m is greater than n.

3. The system of claim 1, wherein the ML model of the embedding model comprises an artificial neural network.

4. The system of claim 1, wherein the embedding model is configured to determine the corresponding embedding vector for each respective point further based on processing, by the ML model, an additional waveform that represents a source light pulse transmitted by the LIDAR towards the respective point, and wherein the corresponding waveform of the respective point represents a reflection of the source light pulse from the respective point.

5. The system of claim 1, wherein the signal processor is further configured to determine, for each respective point and based on the corresponding waveform, an additional value representing a particular physical characteristic of the physical characteristics of the respective point, wherein the additional value is computed using a predetermined algorithm that defines a relationship between one or more characteristics of the corresponding waveform and the particular physical characteristic.

6. The system of claim 1, wherein the physical characteristics of the respective point comprise presence of an occlusion between the LIDAR device and the respective point, and wherein a combination of one or more values of the plurality of values that are representative of the physical characteristics of the respective point indicate an extent of the occlusion between the LIDAR device and the respective point.

7. The system of claim 1, wherein the physical characteristics of the respective point comprise presence of smoke between the LIDAR device and the respective point, and wherein a combination of one or more values of the plurality of values that are representative of the physical characteristics of the respective point indicate a density of the smoke between the LIDAR device and the respective point.

8. The system of claim 1, wherein the physical characteristics of the respective point comprise presence of moisture between the LIDAR device and the respective point, and wherein a combination of one or more values of the plurality of values that are representative of the physical characteristics of the respective point indicate an extent of the moisture between the LIDAR device and the respective point.

9. The system of claim 1, further comprising:
a concatenator configured to modify the map by appending, for each respective point, the plurality of values of the corresponding embedding vector to a representation of the respective point in the map, wherein the feature detector is configured to detect or classify the physical feature based on the modified map received from the concatenator.

10. The system of claim 1, wherein the feature detector comprises an additional ML model, and wherein the embedding model and the additional ML model are trained to detect or classify the physical feature based on (i) a first plurality of sample waveforms that represent a first plurality of sample environments that contain the physical feature and (ii) a second plurality of sample waveforms that represent a second plurality of sample environments that do not contain the physical feature.

11. The system of claim 1, wherein the feature detector comprises a plurality of ML models each configured to classify the physical feature by determining a suitability of a portion of the environment containing the physical feature for performance of one of a plurality of tasks by a vehicle.

12. The system of claim 1, further comprising:
a vehicle configured to move through the environment, wherein the feature detector is configured to classify the physical feature by determining whether the physical feature is traversable by the vehicle based on the corresponding embedding vectors of the one or more points of the plurality of points; and
a control system of the vehicle configured to:
based on the feature detector indicating that the physical feature is traversable by the vehicle, cause the vehicle to drive over the physical feature; and
based on the feature detector indicating that the physical feature is not traversable by the vehicle, cause the vehicle to drive around the physical feature.

13. The system of claim 1, wherein the feature detector is configured to determine that the physical feature occludes at least one other physical feature within the environment from a view of the LIDAR device.

14. The system of claim 1, wherein one or more of the physical characteristics of the respective point represented by the plurality of values of the corresponding embedding vector are not determinable by the signal processor using a predetermined algorithm implemented by the signal processor.

15. The system of claim 1, wherein each of the plurality of values of the corresponding embedding vector is interpretable by the feature detector, and wherein one or more of the plurality of values of the corresponding embedding vector is non-human-interpretable.

16. The system of claim 1, wherein the embedding model defines an empirically-determined mapping between characteristics of the corresponding waveform and the physical characteristics of the respective point.

17. The system of claim 16, wherein the empirically-determined mapping is determined such that, when the physical characteristics of a first respective point have at least a threshold degree of similarity to the physical characteristics of a second respective point, the corresponding embedding vector of the first respective point is within a threshold distance of the embedding corresponding vector of the second respective point.

18. A method comprising:
receiving, by a processor, from a light detection and ranging (LIDAR) device, and for each respective point of a plurality of points in an environment, a corresponding waveform that represents physical characteristics of the respective point;
determining, by the processor and based on the corresponding waveform of each respective point, a map of the environment that includes a representation of a corresponding position of the respective point within the environment;
determining, by the processor, for each respective point, and based on processing the corresponding waveform of the respective point by a machine learning (ML) model of an embedding model, a corresponding embedding vector, wherein the corresponding embedding vector comprises a plurality of values that represent the physical characteristics of the respective point in a vector space defined by the embedding model; and
detecting or classifying, by the processor, a physical feature within the environment based on (i) the corresponding positions of one or more points of the plurality of points and (ii) the corresponding embedding vectors of the one or more points.

19. The method of claim 18, wherein the embedding model defines an empirically-determined mapping between characteristics of the corresponding waveform and the physical characteristics of the respective point, and wherein the empirically-determined mapping is determined such that, when the physical characteristics of a first respective point have at least a threshold degree of similarity to the physical characteristic of a second respective point, the corresponding embedding vector of the first respective point is within a threshold distance of the corresponding embedding vector of the second respective point.

20. A non-transitory computer readable storage medium having stored thereon instructions that, when executed by a computing system, cause the computing system to perform operations comprising:
receiving, from a light detection and ranging (LIDAR) device and for each respective point of a plurality of points in an environment, a corresponding waveform that represents physical characteristics of the respective point;
determining, based on the corresponding waveform of each respective point, a map of the environment that includes a representation of a corresponding position of the respective point within the environment;
determining, for each respective point and based on processing the corresponding waveform of the respective point by a machine learning (ML) model of an embedding model, a corresponding embedding vector, wherein the corresponding embedding vector comprises a plurality of values that represent the physical characteristics of the respective point in a vector space defined by the embedding model; and
detecting or classifying a physical feature within the environment based on (i) the corresponding positions of one or more points of the plurality of points and (ii) the corresponding embedding vectors of the one or more points.

* * * * *